(12) United States Patent
Cooper et al.

(10) Patent No.: US 9,981,675 B2
(45) Date of Patent: *May 29, 2018

(54) INSPECTION SYSTEM AND METHOD

(71) Applicant: GENERAL ELECTRIC COMPANY, Schenectady, NY (US)

(72) Inventors: Jared Klineman Cooper, Palm Bay, FL (US); Nicholas David Nagrodsky, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/240,487

(22) Filed: Aug. 18, 2016

(65) Prior Publication Data

US 2016/0355201 A1 Dec. 8, 2016

Related U.S. Application Data

(63) Continuation of application No. 14/094,745, filed on Dec. 2, 2013, now Pat. No. 9,446,776.

(60) Provisional application No. 61/732,399, filed on Dec. 2, 2012.

(51) Int. Cl.
| | |
|---|---|
| *B61K 9/08* | (2006.01) |
| *B61L 27/00* | (2006.01) |
| *B61L 23/04* | (2006.01) |
| *B61L 25/02* | (2006.01) |
| *G01S 19/13* | (2010.01) |
| *G01S 19/50* | (2010.01) |

(52) U.S. Cl.
CPC ............ *B61L 27/0016* (2013.01); *B61K 9/08* (2013.01); *B61L 23/042* (2013.01); *B61L 25/025* (2013.01); *G01S 19/13* (2013.01); *G01S 19/50* (2013.01); *B61L 23/044* (2013.01); *B61L 23/045* (2013.01); *B61L 2201/00* (2013.01); *B61L 2205/04* (2013.01)

(58) Field of Classification Search
CPC ....... B61K 9/08; B61L 23/044; B61L 23/045; B61L 2205/04
See application file for complete search history.

(56) References Cited

U.S. PATENT DOCUMENTS

| | | | |
|---|---|---|---|
| 7,562,563 B2 * | 7/2009 | Wee | G01B 11/306 73/104 |
| 8,405,837 B2 * | 3/2013 | Nagle, II | G01C 3/08 356/625 |
| 2004/0122580 A1 * | 6/2004 | Sorrells | G07C 5/008 701/80 |
| 2005/0061923 A1 * | 3/2005 | Kane | B61L 3/125 246/167 R |
| 2014/0142868 A1 * | 5/2014 | Bidaud | G01N 21/8803 702/40 |

* cited by examiner

*Primary Examiner* — Michael J Zanelli
(74) *Attorney, Agent, or Firm* — GE Global Patent Operation; John A. Kramer

(57) ABSTRACT

An inspection system for use with a vehicle includes a database containing vehicle route data and at least one location of a route to be inspected. The database may be accessed by vehicles with on-board inspection systems so that they may inspect the location of route to be inspected.

19 Claims, 3 Drawing Sheets

INSPECTION SYSTEM AND METHOD

CROSS-REFERENCE TO RELATED APPLICATIONS

This application is a continuation of U.S. application Ser. No. 14/094,745 filed Dec. 2, 2013, which claims priority to U.S. Provisional Application Ser. No. 61/732,399 filed Dec. 2, 2012, and both of which are hereby incorporated by reference herein in their entireties.

TECHNICAL FIELD

Embodiments of the invention relate to system for route inspection and associated methods.

DISCUSSION OF ART

In the rail industry, it is important to maintain the railroad track and its components, e.g., fasteners and rail segments, as the condition of the track can affect the reliability of rail transportation over the track. Maintenance often involves inspection of the track, which historically has been accomplished through a visual inspection by a rail worker. Rail workers either perform a visual inspection on foot, which, as will be appreciated, is laborious and inefficient, or from a moving vehicle, which can be inaccurate given depending upon the vehicle speed, height, ambient light conditions, etc.

Alternatively, rail inspection may be accomplished through the use of railway inspection vehicles equipped with onboard sensors. Such vehicles typically employ an array of sensors that measure multiple parameters for maintenance planning and the like. In particular, optical sensors such as laser scanners, still cameras and video systems may be utilized. Such systems are used to measure parameters such as rail-to-rail gauge, rail head profile, catenary wire position and wear, track geometry, and clearances. Such systems may require user input to initiate inspections of track or other rail assets, e.g., an on-board rail worker activates a sensor system when the vehicle is passing over an area to be inspected.

Moreover, inspections of certain sections of track may need to be performed periodically for regulatory or other purposes and scheduling such inspections can be logistically challenging if many sections need inspection. Furthermore, for enhanced accuracy, it may be desirable to inspect a section of track multiple times using multiple inspection vehicles. As will be appreciated, such inspections may present logistical difficulties.

It may be desirable to have a system and method for coordinating the inspection of a route by an inspection vehicle having onboard sensors.

BRIEF DESCRIPTION

In an embodiment, an inspection system includes a database containing vehicle route data and at least one location of a route to be inspected. The database is configured to be accessed by a vehicle with an on-board inspection system, for the vehicle, when on a route contained in the database, to inspect one or more locations along the route.

In another embodiment, an inspection system includes a sensor system on board a vehicle configured for inspection of a route on which the vehicle is configured to travel. The system further comprises a control system on board the vehicle, wherein the control system includes an energy management system, e.g., the energy management system is a sub-system of the vehicle control system. The energy management system is configured to generate a trip plan to control movement of the vehicle. The trip plan, for example, may comprise throttle settings as a function of at least one of location or time. The system further includes a database. The control system is configured to communicate with the database. The database contains vehicle route data, a location of the route to be inspected, a frequency that the location of the route is to be inspected, and a previous time that the location of the route was inspected. The control system is configured to activate the sensor system for inspecting the route based on the frequency, the previous time, and a location of the vehicle as cross-referenced to the database.

In an embodiment, a method (e.g., vehicle control method) includes establishing a time period during which a vehicle route inspection location is to be inspected and identifying all inspection vehicles that will be traveling along a route containing the vehicle route inspection location during the established time period. The method further involves directing inspection vehicles travelling along the route during the time period to inspect the inspection location.

BRIEF DESCRIPTION OF DRAWINGS

Reference will be made in detail to exemplary embodiments of the invention, examples of which are illustrated in the accompanying drawings. Wherever possible, the same reference numerals used throughout the drawings refer to the same or like parts.

DETAILED DESCRIPTION

Embodiments of the invention relate to a rail inspection system and method. As used herein, "rail vehicle" refers to a vehicle that travels over one or more fixed rails; examples include locomotives, switchers, shunters, including both freight haulage and passenger locomotives, which themselves may be diesel electric or all electric, and that may run on either AC or DC electric power, and rail vehicles such as rail cars for hauling cargo, ore carts, etc. The term "optical sensors" refers to sensors that employ optics including, but not limited to, laser scanners, still cameras, and video systems. "Sensor system" includes optical sensors, as defined above, as well as x-ray systems, heat sensors and the like.

Figure 1:
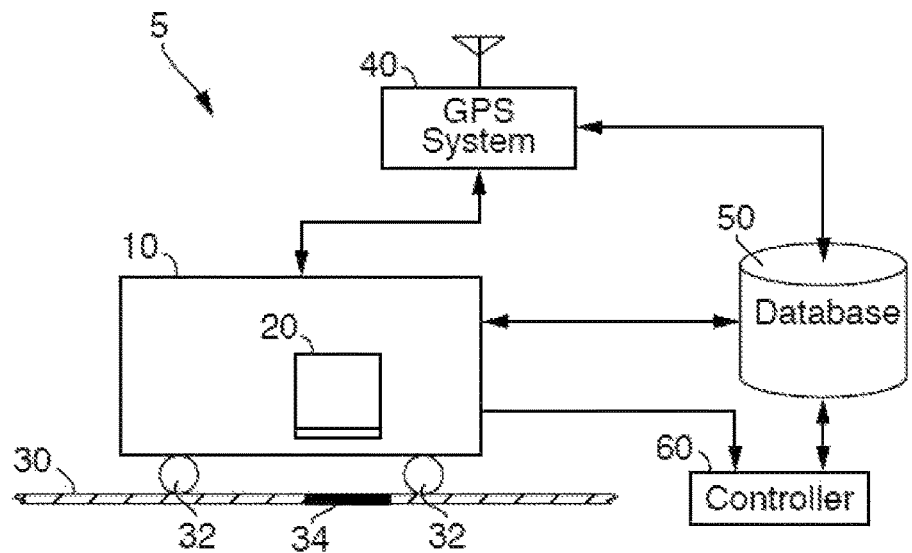
FIG. 1 is a schematic drawing of an inspection system in accordance with an embodiment of the invention.

An embodiment of a rail inspection system 5 is configured for use with a locomotive or other rail vehicle. For example, FIG. 1 shows a schematic diagram of a vehicle, herein depicted as a rail vehicle 10, configured to run on a rail 30 via a plurality of wheels 32. The rail vehicle 10 includes an engine, such as an internal combustion engine. A plurality of traction motors (not shown) are mounted on a truck frame and are each connected to one of a plurality of wheels 32 to provide tractive power to propel and retard the motion of the rail vehicle 10. A journal box (not shown) may be coupled to truck frame at one or more of the wheels 32. The traction motors may receive electrical power from a generator to provide tractive power to the rail vehicle 10.

The rail vehicle 10 also includes a sensor system 20, which may be an optical inspection system, to inspect the track and other assets. In an embodiment, the sensor system is an optical inspection system that includes a sensor that has a transparent window or cover. As shown, the rail vehicle 10 is operatively connected to a GPS system 40 as well as a route database 50.

The route database includes information regarding various rail vehicle routes as well as specific information regarding locations along the route that need to be inspected, e.g., sections of track or other assets.

The route database may also receive rail vehicle location information from GPS system 40 regarding a rail vehicle's location. If the location of the rail vehicle 10 is in proximity to an inspection location 34, the system may transmit this information to the rail vehicle 10 so that the sensor system 20 can inspect the location 34. In certain embodiments, the rail vehicle may periodically contact or otherwise connect with the database to determine whether it is on a route with an inspection location 34. The vehicle's location on the route may then be confirmed by the GPS and the inspection system 20 can inspect location 34. Operation of the system 5 may be effectuated through software residing on-board the vehicle or off-board.

In particular, operation of the optical or other sensor on the rail vehicle may be directed by a rail network controller 60. The controller 60 is operatively connected to the rail vehicle 10, inspection system 20, and/or the database 50.

In another embodiment, a controller 60 may direct an inspection vehicle to inspect a location 34 based on temporal considerations. That is, the database 50 may contain route data along with information regarding the location of inspection locations 34, the date of last inspection and the frequency with which inspections should occur for the location 34. When a location 34 is due for an inspection, the controller 60, utilizing GPS location information, can direct an inspection vehicle to inspect the location 34. The frequency of inspection can be dictated by normal maintenance intervals, regulatory inspection schedules and the like.

In another embodiment, multiple rail vehicles travelling along a route may inspect the same location 34 within a certain time frame to verify the condition or status of the location 34. In this embodiment, coordination of the rail vehicles may be accomplished through communication between the inspection vehicles and the database. That is, the database containing route and location data is accessed by the vehicles and, if a predetermined number of vehicles on a route are set to pass over a certain location 34 within a predetermined time frame, the inspection vehicles would be directed to inspect location 34.

In certain embodiments, the controller 60 may obtain GPS location information from GPS system 40 and assess the number of vehicles on a route and when they will pass over a location 34 obtained from the database. The controller can then direct certain vehicles along the route to inspect the location.

In other embodiments, the controller 60 may utilize vehicle location data obtained from an RFID system. That is, the vehicle route may have RFID receivers placed at various locations, which receive input from onboard RFID transmitters. The controller 60 could then access data from the receivers to determine the presence and location of an inspection vehicle on a route having inspection locations.

In other embodiments, there may be multiple inspection vehicles in a single consist (referring to plural vehicle mechanically coupled to travel together along a route). Here, one or more of the inspection vehicles in a consist may be directed to inspect a location 34. If the lead vehicle receives instructions to inspect a location 34 using multiple inspection vehicles in the consist, the lead vehicle can instruct the various inspection vehicles through wireless communication using radio equipment, through dedicated network cables between vehicles, or, in some instances, over existing power lines.

The route database 50 may be stored on a solid-state drive or other mass data storage device. The route database may be located on board the rail vehicle having an optical inspection or other sensor system or on another vehicle in a consist with an optical inspection (or other) vehicle. For example, the route database may be part of a rail vehicle's on-board electronics used to monitor and control traction, engine, and braking systems. These existing electronics often include one or more processors coupled to a mass data storage system via a bus interface. These interconnected components may be stored within the locomotive.

In other embodiments, the route database 50 is location off-board the vehicle. The rail vehicle may communicate with the database over a wireless network regardless of the location of the database.

As will be appreciated, the inspection vehicles 10 may also collect and report the status and/or condition of the tracks to the database 50 for use in generating a map of track conditions. Further, this collected information can be fed into a network management program to better allocate inspection scheduling.

In certain embodiments, the inspection system may be used in connection with an automated dispatch system that guides the movement of freight and/or passenger trains in a transportation network that includes a location or locations to be inspected. In embodiments, an automated dispatch system, e.g., a movement planner, can be employed to establish a time period during which a rail track inspection location is to be inspected, identify all rail inspection vehicles that will be traveling along a route containing the rail track inspect location during the established time period, and then direct rail inspection vehicles travelling along the route during the time period to inspect the inspection location. Exemplary movement planners are described in, for example, U.S. Pat. No. 8,380,373, which is incorporated by reference herein in its entirety.

In an embodiment, an inspection system for use with a rail vehicle is provided. The inspection system includes a database containing vehicle route data and at least one location of track to be inspected. The database may be accessed by rail vehicles with on-board inspection systems so that they may inspect the location of track to be inspected.

Figure 2:
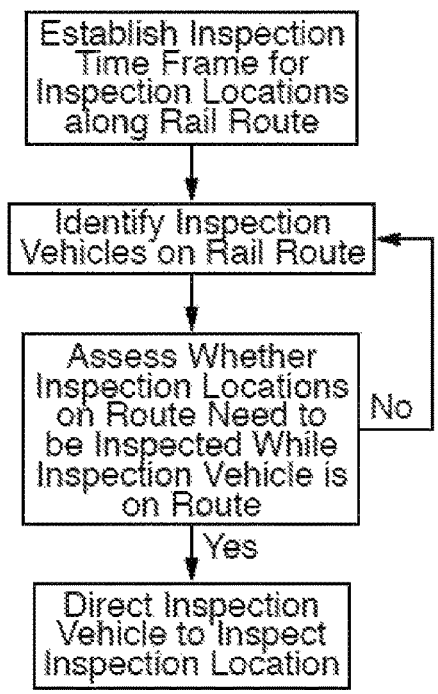
FIG. 2 is a flowchart illustrating an inspection method in accordance with an embodiment of the invention.

As illustrated in FIG. 2, in an embodiment, a method is provided which includes identifying a route over which an inspection vehicle is travelling and determining if the route contains an inspection location from a database containing routes and inspection locations for the routes. The processers then direct an inspection vehicle to inspect an inspection location along the route.

In an embodiment, a method is provided which includes establishing a time period during which a rail track inspection location is to be inspected and identifying all rail inspection vehicles that will be traveling along a route containing the rail track inspect location during the established time period. The method further involves directing rail inspection vehicles travelling along the route during the time period to inspect the inspection location.

In an embodiment, an inspection system for use with a rail vehicle is provided. The system including a database containing vehicle route data, at least one location of track to be inspected, the frequency that the location requires inspection, and the last time that the location was inspected. The database may be accessed by rail vehicles with on-board inspection systems so that vehicles on a route contained in the database may inspect a location when the location is due for an inspection.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The database is located on-board the rail vehicle. Alternatively, in other embodiments, the database is located off-board the rail vehicle.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a global positioning system configured to determine a location of the rail vehicle along a route in the database.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a sensor system on board the rail vehicle configured for inspection of the track.

Figure 3:
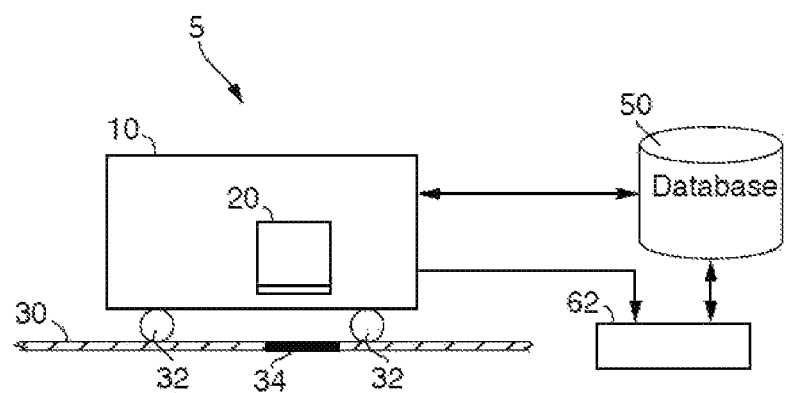
FIGS. 3-8 are schematic drawings of various inspection systems, in accordance with embodiments of the invention.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The database is configured to be updated with the at least one location of track to be inspected from an off-board scheduling system 62 (see FIG. 3) that is configured to schedule the movement of the rail vehicle and plural other rail vehicles in a transportation system that includes the track.

Figure 4:
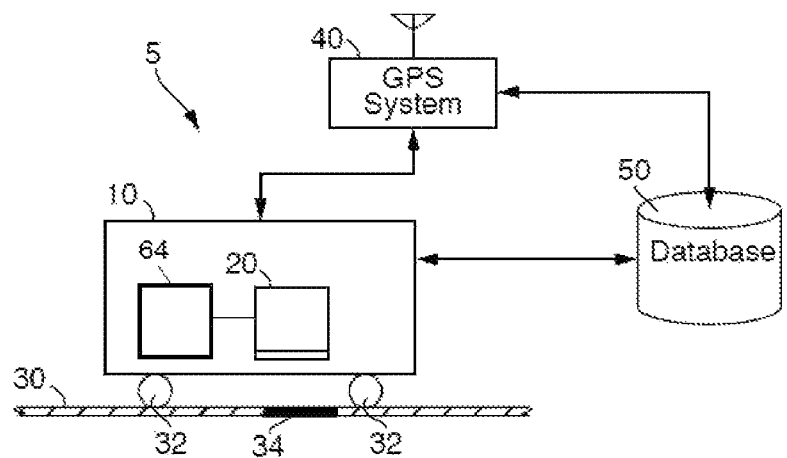

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a global positioning system configured to determine a location of the rail vehicle along a route in the database, a sensor system on board the rail vehicle configured for inspection of the track, and a control system 64 (see FIG. 4) on board the rail vehicle. The control system is configured to activate the sensor system for inspecting the track based on the location determined by the global positioning system as cross-referenced to the database.

Figure 5:
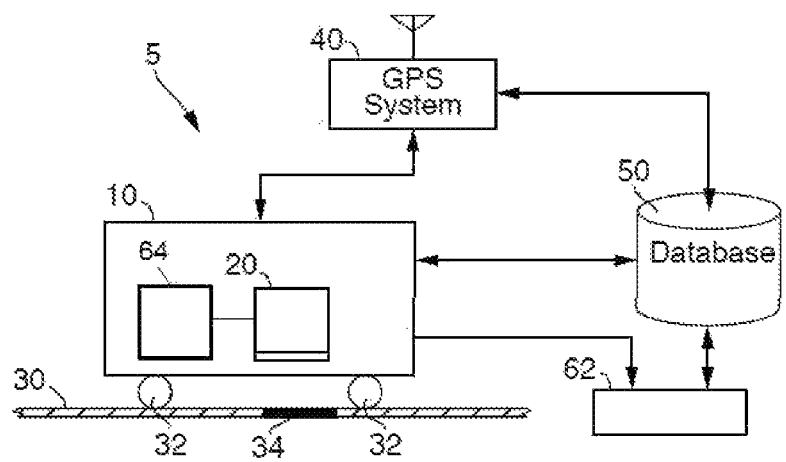

In an embodiment (see FIG. 5), an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a global positioning system configured to determine a location of the rail vehicle along a route in the database, a sensor system on board the rail vehicle configured for inspection of the track, and a control system on board the rail vehicle. The control system is configured to activate the sensor system for inspecting the track based on the location determined by the global positioning system as cross-referenced to the database. The database is configured to be updated with the at least one location of track to be inspected from an off-board scheduling system that is configured to schedule the movement of the rail vehicle and plural other rail vehicles in a transportation system that includes the track.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a global positioning system configured to determine a location of the rail vehicle along a route in the database, a sensor system on board the rail vehicle configured for inspection of the track, and a control system on board the rail vehicle. The control system is configured to activate the sensor system for inspecting the track based on the location determined by the global positioning system as cross-referenced to the database. The database further contains one or more frequencies that the at least one location of track is to be inspected and one or more previous times that the at least one location of track was inspected. The control system is configured to activate the sensor system for inspecting the track further based on the one or more frequencies and the one or more previous times.

Figure 6:
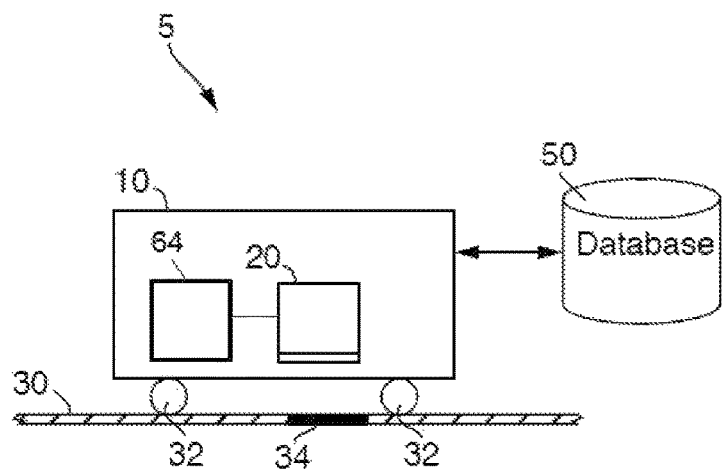

In an embodiment (see FIG. 6), an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a sensor system on board the rail vehicle configured for inspection of the track, and a control system on board the rail vehicle. The control system is configured to activate the sensor system for inspecting the track based on a location of the rail vehicle as cross-referenced to the database.

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a sensor system on board the rail vehicle configured for inspection of the track, and a control system on board the rail vehicle. The control system is configured to activate the sensor system for inspecting the track based on a location of the rail vehicle as cross-referenced to the database. The database further contains one or more frequencies that the at least one location of track is to be inspected and one or more previous times that the at least one location of track was inspected. The control system is configured to activate the sensor system for inspecting the track further based on the one or more frequencies and the one or more previous times.

Figure 7:
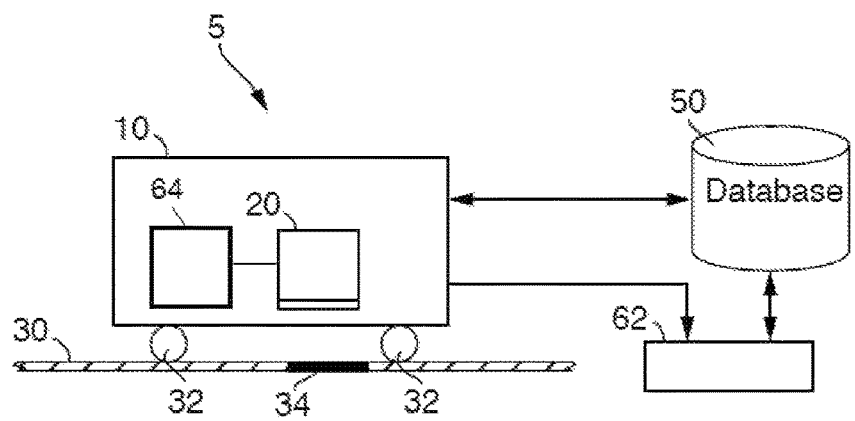

In an embodiment (see FIG. 7), an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a sensor system on board the rail vehicle configured for inspection of the track, and a control system on board the rail vehicle. The control system is configured to activate the sensor system for inspecting the track based on a location of the rail vehicle as cross-referenced to the database. The database is configured to be updated with the at least one location of track to be inspected by an off-board scheduling system that is configured to schedule the movement of the rail vehicle and plural other rail vehicles in a transportation system that includes the track.

Figure 8:
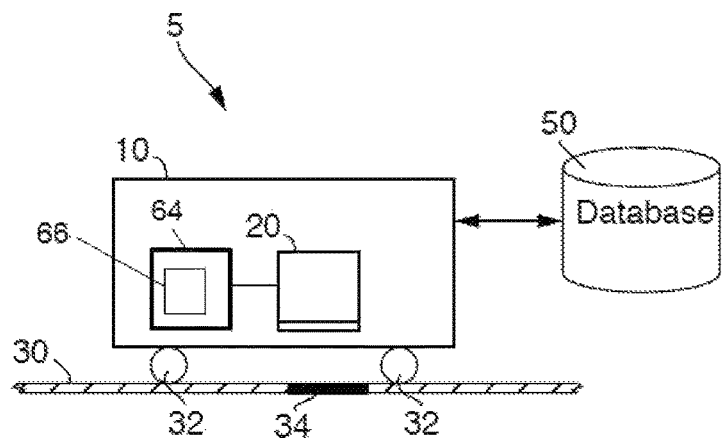

In an embodiment, an inspection system comprises a database containing vehicle route data and at least one location of track to be inspected. The database is configured to be accessed by a rail vehicle with an on-board inspection system, for the rail vehicle, when on a route contained in the database, to inspect one or more locations of track to be inspected along the route. The system further comprises a sensor system on board the rail vehicle configured for inspection of the track, and a control system on board the rail vehicle. The control system is configured to activate the sensor system for inspecting the track based on a location of the rail vehicle as cross-referenced to the database. The system further comprises an energy management system 66 (see FIG. 8) on board the rail vehicle, the energy management system configured to generate a trip plan to control movement of the rail vehicle. The trip plan comprises throttle settings as a function of at least one of location or time. The energy management system is configured to generate the trip plan based at least in part on the database.

In another embodiment, an inspection system comprises a sensor system on board a rail vehicle configured for inspection of track on which the rail vehicle is configured to travel. The system further comprises a control system on board the rail vehicle, wherein the control system includes an energy management system on board the rail vehicle (e.g., the energy management system is a sub-system of the vehicle control system). The energy management system is configured to generate a trip plan to control movement of the rail vehicle. The trip plan comprises throttle settings as a function of at least one of location or time. The system further comprises a database stored on a non-transient computer readable electronic storage medium. The control system is configured to communicate with the database, e.g., the control system is configured to interface with the computer readable electronic storage medium for accessing data stored in the database. The database contains vehicle route data, a location of track to be inspected, a frequency that the location of track is to be inspected, and a previous time that the location of track was inspected. The control system is configured to activate the sensor system for inspecting the track based on the frequency, the previous time, and a location of the rail vehicle as cross-referenced to the database. The computer readable electronic storage medium may be on-board the rail vehicle, or, in other embodiments, is off-board the rail vehicle.

In another embodiment, an inspection system comprises a sensor system on board a rail vehicle configured for inspection of track on which the rail vehicle is configured to travel. The system further comprises a control system on board the rail vehicle, wherein the control system includes an energy management system on board the rail vehicle (e.g., the energy management system is a sub-system of the vehicle control system). The energy management system is configured to generate a trip plan to control movement of the rail vehicle (e.g., the energy management system may be configured to automatically control the vehicle based on the trip plan). The trip plan comprises throttle settings as a function of at least one of location or time. The system further comprises a database stored on a non-transient computer readable electronic storage medium. The control system is configured to communicate with the database, e.g., the control system is configured to interface with the computer readable electronic storage medium for accessing data stored in the database. The database contains vehicle route data, a location of track to be inspected, a frequency that the location of track is to be inspected, and a previous time that the location of track was inspected. The control system is configured to activate the sensor system for inspecting the track based on the frequency, the previous time, and a location of the rail vehicle as cross-referenced to the database. The database is configured to be updated with at least one of the location of track to be inspected, the vehicle route data, the frequency, or the previous time by an off-board scheduling system that is configured to schedule the movement of the rail vehicle and plural other rail vehicles in a transportation system that includes the track.

In another embodiment, a method comprises establishing a time period during which a rail track inspection location is to be inspected, identifying all rail inspection vehicles that will be traveling along a route containing the rail track inspect location during the established time period, and directing rail inspection vehicles travelling along the route during the time period to inspect the inspection location.

In another embodiment, a method comprises establishing a time period during which a rail track inspection location is to be inspected, identifying all rail inspection vehicles that will be traveling along a route containing the rail track inspect location during the established time period, and directing rail inspection vehicles travelling along the route during the time period to inspect the inspection location. The rail inspection vehicles are at least one of freight trains and passenger trains. The steps are carried out by an automated dispatch system that is configured to guide the movement of the at least one of the freight trains and passenger trains in a transportation network that include the location.

In another embodiment, a method comprises identifying a route over which an inspection vehicle is travelling, determining if the route contains an inspection location from a database containing routes and inspection locations for the routes, and directing an inspection vehicle to inspect an inspection location along the route.

In another embodiment, a method comprises identifying a route over which an inspection vehicle is travelling, determining if the route contains an inspection location from a database containing routes and inspection locations for the routes, and directing an inspection vehicle to inspect an inspection location along the route. The route is identified by accessing global positioning system data regarding the inspection vehicle's location.

The above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects, unless otherwise stated.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods.

What is claimed is:

1. An inspection system, comprising:
    a sensor system on board a vehicle and configured for inspection of a route on which the vehicle is configured to travel, the sensor system comprising at least an optical sensor;
    a database containing vehicle route data and at least one location of the route to be inspected;
    a control system on board the vehicle, wherein the control system is configured to activate the sensor system for inspecting the route based on a location of the vehicle as cross-referenced to the database; and
    an energy management system on board the vehicle, the energy management system configured to control movement of the vehicle based at least in part on the database.

2. The system of claim 1, wherein the database is located on-board the vehicle.

3. The system of claim 1, wherein the database is located off-board the vehicle.

4. The system of claim 1, further comprising a global positioning system on board the vehicle and configured to determine the location of the vehicle along the route.

5. The system of claim 1, wherein the energy management system is configured to generate a trip plan to control movement of the vehicle, the trip plan comprising throttle settings as a function of at least one of location or time, and wherein the energy management system is configured to generate the trip plan based at least in part on the database.

6. The system of claim 1, wherein the database is configured to be updated with the at least one location of the route to be inspected from an off-board scheduling system that is configured to schedule the movement of the vehicle and a plurality of other vehicles in a transportation system that includes the route.

7. The system of claim 1, further comprising a global positioning system on board the vehicle and configured to determine the location of the vehicle along the route, wherein the control system is configured to activate the sensor system for inspecting the route based on the location determined by the global positioning system as cross-referenced to the database.

8. The system of claim 7, wherein the database is configured to be updated with the at least one location of the route to be inspected from an off-board scheduling system that is configured to schedule the movement of the vehicle and a plurality of other vehicles in a transportation system that includes the route.

9. The inspection system of claim 1, wherein the route comprises a track having rails, and the vehicle comprises a rail vehicle.

10. An inspection system comprising:
    a sensor system on board a vehicle configured for inspection of a route on which the vehicle is configured to travel;
    a control system on board the vehicle, wherein the control system includes an energy management system that is configured to generate a trip plan to control movement of the vehicle; and
    a database that contains vehicle route data, a location of the route to be inspected, a frequency that the location of the route is to be inspected, and a previous time that the location of the route was inspected;
    wherein the control system is configured to activate the sensor system for inspecting the route based on the frequency, the previous time, and a location of the vehicle as cross-referenced to the database.

11. The system of claim 10, wherein the database is on-board the vehicle.

12. The system of claim 10, wherein the database is off-board the vehicle.

13. The system of claim 10, wherein the database is configured to be updated with at least one of the location of the route to be inspected, the vehicle route data, the frequency, or the previous time by an off-board scheduling system that is configured to schedule the movement of the vehicle and plural other vehicles in a transportation system that includes the route.

14. The system of claim 10, wherein the energy management system is configured to automatically control movement of the vehicle based on the trip plan.

15. The inspection system of claim 10, wherein the route comprises a track having rails, and the vehicle comprises a rail vehicle.

16. A method comprising the steps of:
    establishing a time period during which a vehicle route inspection location is to be inspected;
    identifying all inspection vehicles that will be traveling along a route containing the vehicle route inspection location during the established time period; and
    directing inspection vehicles travelling along the route during the time period to inspect the inspection location.

17. The method of claim 16, wherein the steps are carried out by an automated dispatch system that is configured to guide the movement of the inspection vehicles in a transportation network that include the location.

18. An inspection system, comprising:
    a sensor system on board a vehicle, the sensor system configured for optical inspection of a route on which the vehicle is configured to travel; and a control system on board the vehicle, wherein the control system is configured to access a database containing vehicle route data;

wherein the control system is further configured to activate the sensor system for inspecting the route based on at least a location of the vehicle as cross-referenced to the database containing vehicle route data; and wherein the database containing vehicle route data comprises:
- at least one or more frequencies that the at least one location of the route is to be inspected;
- at least one or more previous times that the at least one location of the route was inspected; and
- at least one or more locations of the route to be inspected.

19. The inspection system of claim 18, wherein the route comprises a track having rails, and the vehicle comprises a rail vehicle.

\* \* \* \* \*